United States Patent
Sharma et al.

(10) Patent No.: US 8,646,021 B2
(45) Date of Patent: Feb. 4, 2014

(54) METHOD AND APPARATUS FOR PROVIDING AN INTERACTIVE APPLICATION WITHIN A MEDIA STREAM

(75) Inventors: Sudhanshu Sharma, Coppell, TX (US); Neena Pandey, Coppell, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 120 days.

(21) Appl. No.: 13/090,460

(22) Filed: Apr. 20, 2011

(65) Prior Publication Data
US 2012/0272263 A1 Oct. 25, 2012

(51) Int. Cl.
*H04N 7/16* (2011.01)
(52) U.S. Cl.
USPC ........... 725/136; 725/140; 725/142; 725/132; 725/134; 725/152; 725/32; 386/350; 386/351; 717/178
(58) Field of Classification Search
None
See application file for complete search history.

(56) References Cited

U.S. PATENT DOCUMENTS

| | | | | |
|---|---|---|---|---|
| 5,818,440 | A * | 10/1998 | Allibhoy et al. | 715/718 |
| 7,913,277 | B1 * | 3/2011 | Rahrer | 725/36 |
| 2002/0059591 | A1 * | 5/2002 | Nakagawa | 725/36 |
| 2003/0208768 | A1 * | 11/2003 | Urdang et al. | 725/95 |
| 2004/0022278 | A1 * | 2/2004 | Thomas et al. | 370/537 |
| 2004/0240561 | A1 * | 12/2004 | Crinon | 375/240.26 |
| 2006/0031871 | A1 * | 2/2006 | Quere et al. | 725/25 |
| 2006/0059509 | A1 * | 3/2006 | Huang et al. | 725/32 |
| 2006/0174264 | A1 * | 8/2006 | Candelore | 725/34 |
| 2011/0016171 | A1 * | 1/2011 | Kim et al. | 709/203 |
| 2012/0144417 | A1 * | 6/2012 | Khader et al. | 725/32 |

* cited by examiner

*Primary Examiner* — Jason J Chung

(57) ABSTRACT

An approach provides interactive application and advertisement within media streams. A program map table of a media stream is retrieved, wherein the program map table includes a plurality of private descriptor fields that permit user specified tag values. One of the descriptor fields is configured to indicate whether the media stream is associated with an interactive application or advertisement information.

14 Claims, 11 Drawing Sheets

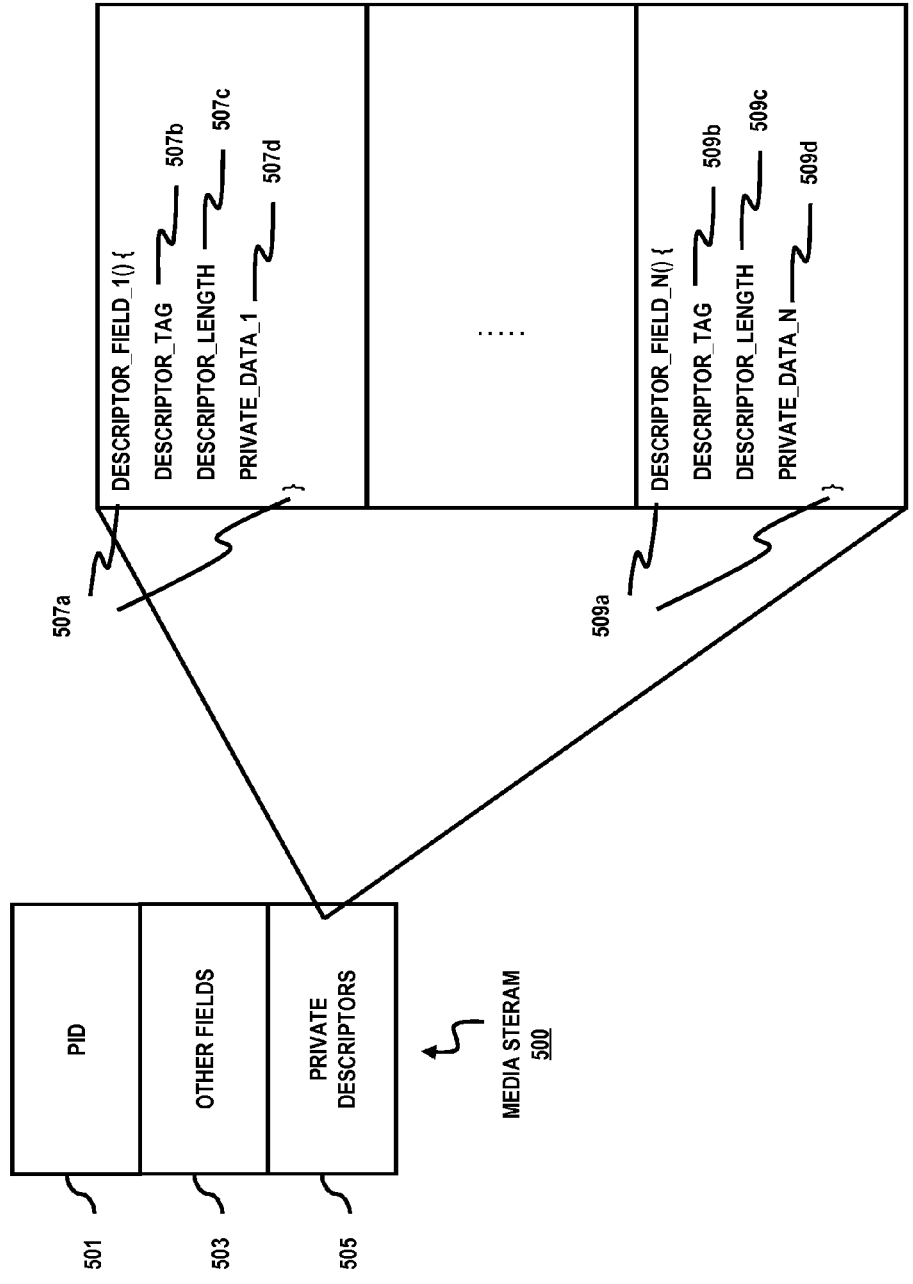

METHOD AND APPARATUS FOR PROVIDING AN INTERACTIVE APPLICATION WITHIN A MEDIA STREAM

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Thus, customers can readily access a vast supply and variety of audio/video content. For example, live audio/video content can be received via a broadcast network, a cable network, Verizon® FiOS® network, satellite network, an internet protocol television (IPTV) system, an internet protocol video system, a wireless network, etc. Concurrently, media services have enjoyed great success in other industries, such as portable media devices (e.g., personal digital assistants (PDAs), MP3 players, mobile phones, etc.), audio streaming services, video streaming, etc. With the vast variety of media content delivery mechanisms, traditional techniques for insertion of advertisements have become inadequate.

Therefore, there is a need for an approach to provide advertisement insertion with minimal operation overhead and cost.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5A-5D are diagrams of private descriptors utilized to provide an interactive application within a media stream, according to various embodiments;

DESCRIPTION OF THE PREFERRED EMBODIMENT

A preferred apparatus, method, and system for providing an interactive application within a media stream are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the STB is explained in the context of call events, it is contemplated that other device events relating to various services and functions are applicable.

Figure 1:
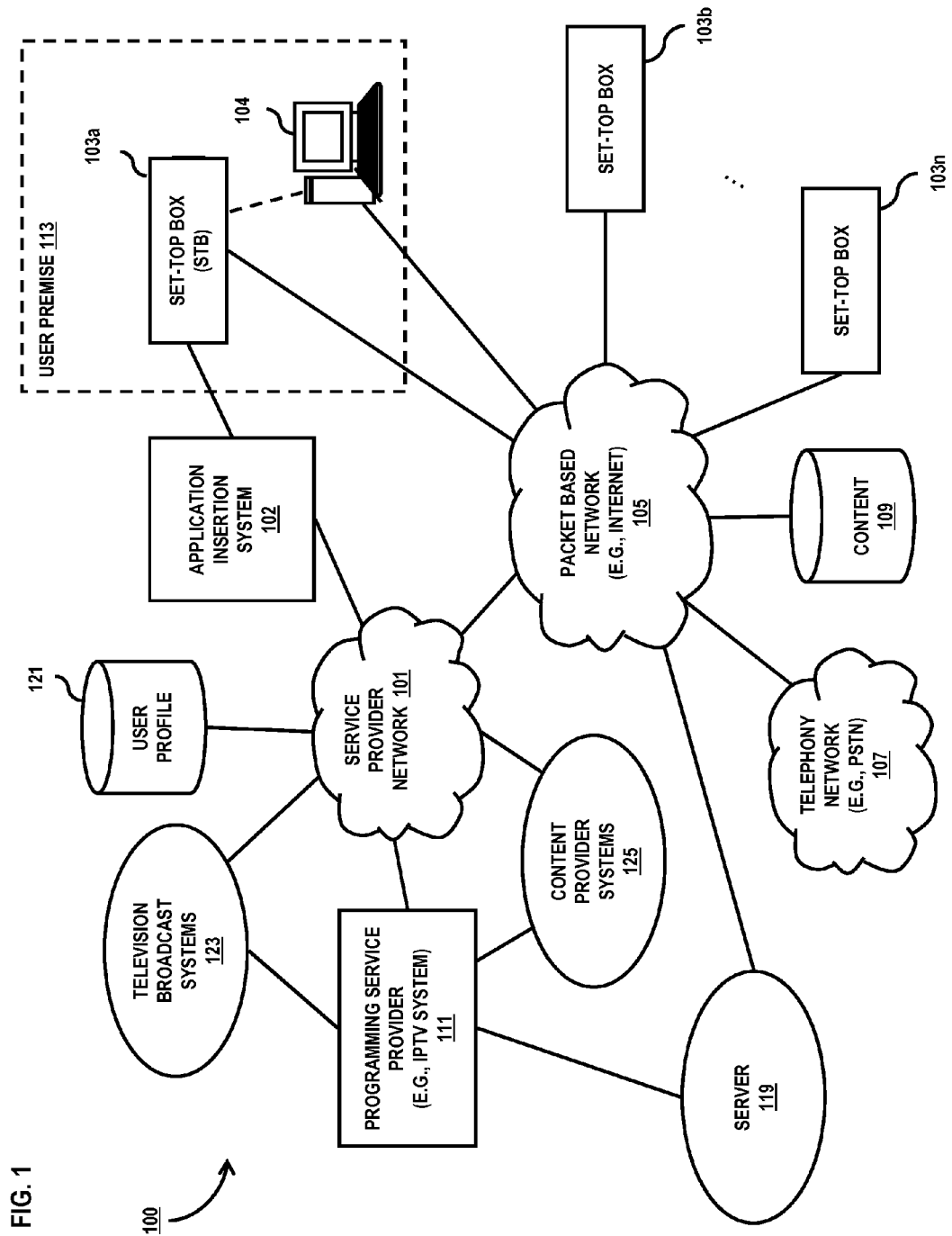
FIG. 1 is a diagram of a system capable of providing an interactive application or advertisement within a media stream, according to one embodiment.

FIG. 1 is a diagram of a system capable of providing an interactive application or advertisement within a media stream, according to one embodiment. For the purposes of illustration, a system 100 is described with respect to processing of media streams that include video and audio content, whereby an interactive application (or advertisement information) can be specified within the media stream. The system 100 includes a service provider network 101 that integrates the television medium with that of the telecommunications, computing, and media environments, thereby broadening the scope of devices and sources available to individuals for obtaining programming content or other media. By way of example, the service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form. An application insertion system 102 provides the insertion of interactive applications and/or advertisements within media streams. In certain embodiments, these media streams include video streams encoded according to Motion Pictures Expert Group (MPEG) standards—e.g., MPEG-2. This process and associated systems are more fully described with respect to FIGS. 2-7.

Traditionally, the inclusion of advertisements in an MPEG-2 stream would require modification of the end user devices, which can be cost prohibitive. However, the approach utilized by application insertion system 102 minimizes the need to employ newly developed equipment and protocols.

In certain embodiments, the user device may be a set-top box, any type of computer device or mobile device having the capability to support voice communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103a-103n and/or terminal 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-103n to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

For example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). For example, exemplary embodiments of media slideshow application may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111.

In the example of FIG. 1, STBs 103a-103n, as end user devices, are located at one or more user premises (e.g., user premise 113), and geospatially associated with one or more regions. STBs 103a-103n may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

In one embodiment, a user profile repository 121 may be employed to maintain subscribers to the device event-based STB control service. User profile repository 121 along with content repository 109, or server 119 may be accessed via one or more service provider networks 101 and/or packet-based networks 105. In one embodiment, the user profile repository 121 stores user settings, preferences, and configuration information relating to the services of network 101. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/to a programming service provider 111 or other content source/sink. A more detailed explanation of an exemplary STB is provided with respect to FIGS. 4 and 8.

In an exemplary embodiment, STBs 103a-103n can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

Although the user equipment is described with respect to an STB 103, it is contemplated that various embodiments have applicability to any device capable of processing video, audio, and/or multimedia streams.

Figure 2:
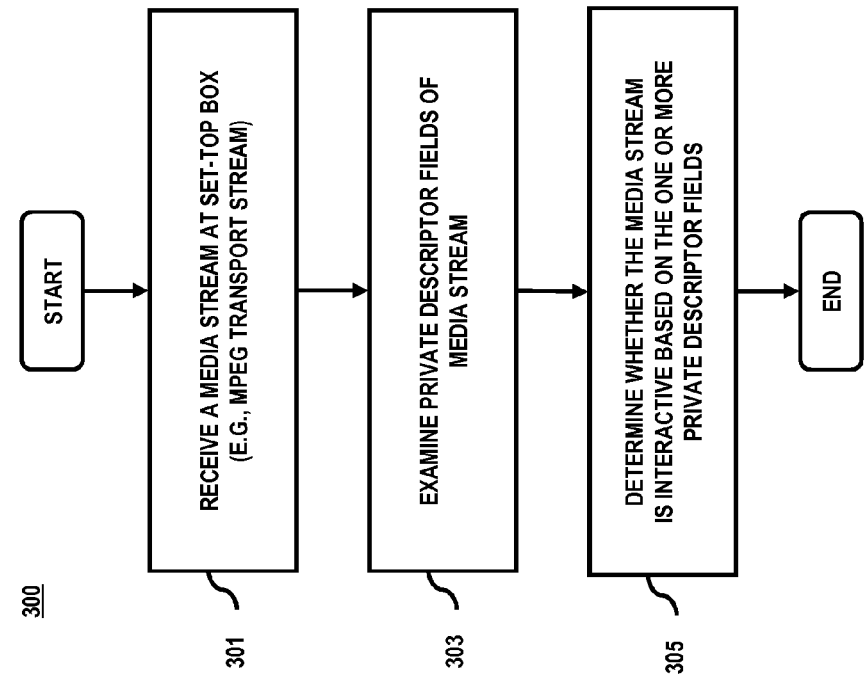
FIG. 2 is a flowchart of a process for configuring program parameters to indicate interactivity of a media stream, according to one embodiment.
Figure 10:
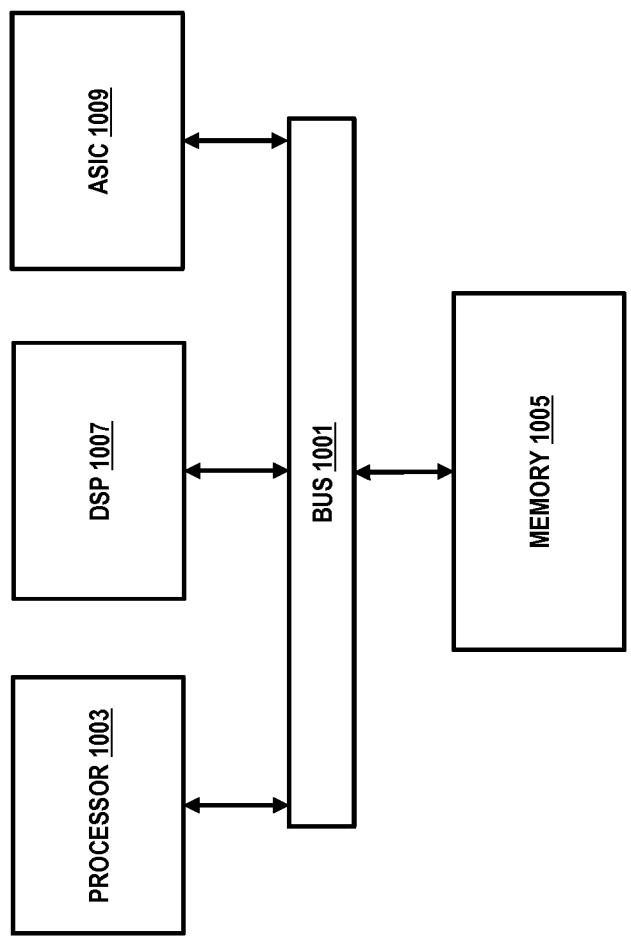
FIG. 10 is a diagram of a chip set that can be used to implement various exemplary embodiments.

FIG. 2 is a flowchart of a process for configuring program parameters to indicate interactivity of a media stream, according to one embodiment. By way of example, process 200 is explained with respect to system 100 of FIG. 1, whereby a media stream is encoded according to a MPEG standard (e.g., MPEG-2). Also, process 200 may be implemented in, for instance, a chip set including a processor and a memory as shown in FIG. 10. According to certain embodiments, application insertion system 102 executes process 200 to insert an interactive application or advertisement into a media stream. It is noted that the steps of process 200 may be performed in any suitable order, as well as combined or separated in any suitable manner.

In step 201, process 200 selects a media stream; under this scenario, the media stream is an MPEG transport stream. Specifically, various program parameters are configured, as in step 203, to specify the following functions/features: (1) whether the video stream is interactive—i.e., includes an interactive application; (2) playback control functions; and (3) broadcast data for the interactive application. As will be more fully described with respect to FIGS. 5A-5D, the program parameters, under the MPEG-2 TS standard, include private descriptors, which are configured to indicate the above functions/features.

An MPEG transport stream (or a program stream) comprises a Program Map Table (PMT), which provides the mappings between program numbers and the program elements that comprise them. A single instance of the mapping is referred to as a program definition, while the PMT refers to the complete collection of all program definitions for a transport stream. The PMT also employs descriptor fields, which are structures for extending the definitions of programs and program elements. For example, descriptors can utilize a format that begins with an 8-bit tag value in addition to an 8-bit descriptor length and 8-bit data fields. The descriptor tag identifies each descriptor; the tag values 64 through 255 are provided as user available descriptor tag values. Further details of some of the descriptors as defined in Table 2-39 of International Organization for Standardization/International Electrotechnical Commission (ISO/IEC) 13818-1—Information Technology—Generic Coding of moving pictures and associated audio information—Part 1—Systems, which is incorporated herein in it entirety.

In one embodiment, a transport stream supports one or more programs, and can be either a fixed rate or variable rate. The transport stream can also be formed using elementary streams of programs, one or more program streams, or other transport streams. By contrast, a program stream is constructed based on a single program, and as with the transport stream can be fixed rate or variable rate. These types of streams are employed depending on the application and/or data services involved. Details of exemplary data services are provided in Electronic Industries Association (EIA)—608B Line 21 Data Services, and EIA—744-A/745/746-A/752/806 Transport of Different Type of Information Using Extended Data Services (XDS); which are all incorporated herein in their entireties.

Private descriptors can be defined using user available private tag values. According to certain embodiments, one or more user available private tag values are utilized to define private descriptors that can be modified to associate one or more programs with one or more applications. These private descriptors may be used to identify an application that is to be executed along with the MPEG stream. For example, the application may be one or more of an interactive national, local, contextual and/or addressable advertisement. In essence, the interactive application, in some embodiments, constitutes the advertisement.

In step 205, the media stream is delivered to a set-top box (e.g., STB 103a). The manner in which this media stream is processed by STB 103a is explained in FIG. 3.

Figure 3:
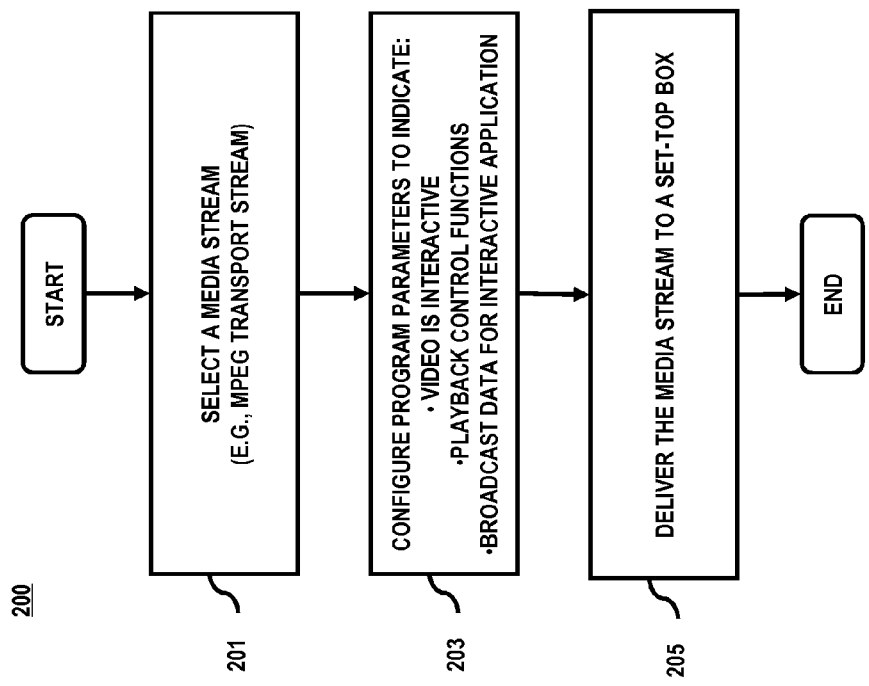
FIG. 3 is a flowchart of a process for determining, by a set-top box (STB), whether a media stream is interactive, according to one embodiment.

FIG. 3 is a flowchart of a process for determining, by a set-top box (STB), whether a media stream is interactive, according to one embodiment. Continuing with the scenario of FIG. 2, process 300 involves the STB 103a receiving the media stream, per step 301. Next, the STB 103a analyzes the PMT, specifically the values of the private descriptors (step 303). For example, one or more of the private descriptors can relate to whether there is an interactive application associated with this received stream. Hence, in step 305, process 300 determines whether the media stream is interactive based on these private descriptors. By way of example, a broadcaster may modify one or more private descriptors of a PMT that provides a program definition for a certain program. The private descriptors may contain information that identifies the content of the program and other data such that an appropriate application may be identified and executed along with the program.

As noted, the above processes, involving the application insertion system 102, can set the private descriptors accordingly to activate use of interactive applications. These applications can serve as advertisements, and/or, augment the user experience of consuming the advertisement information.

Figure 4:
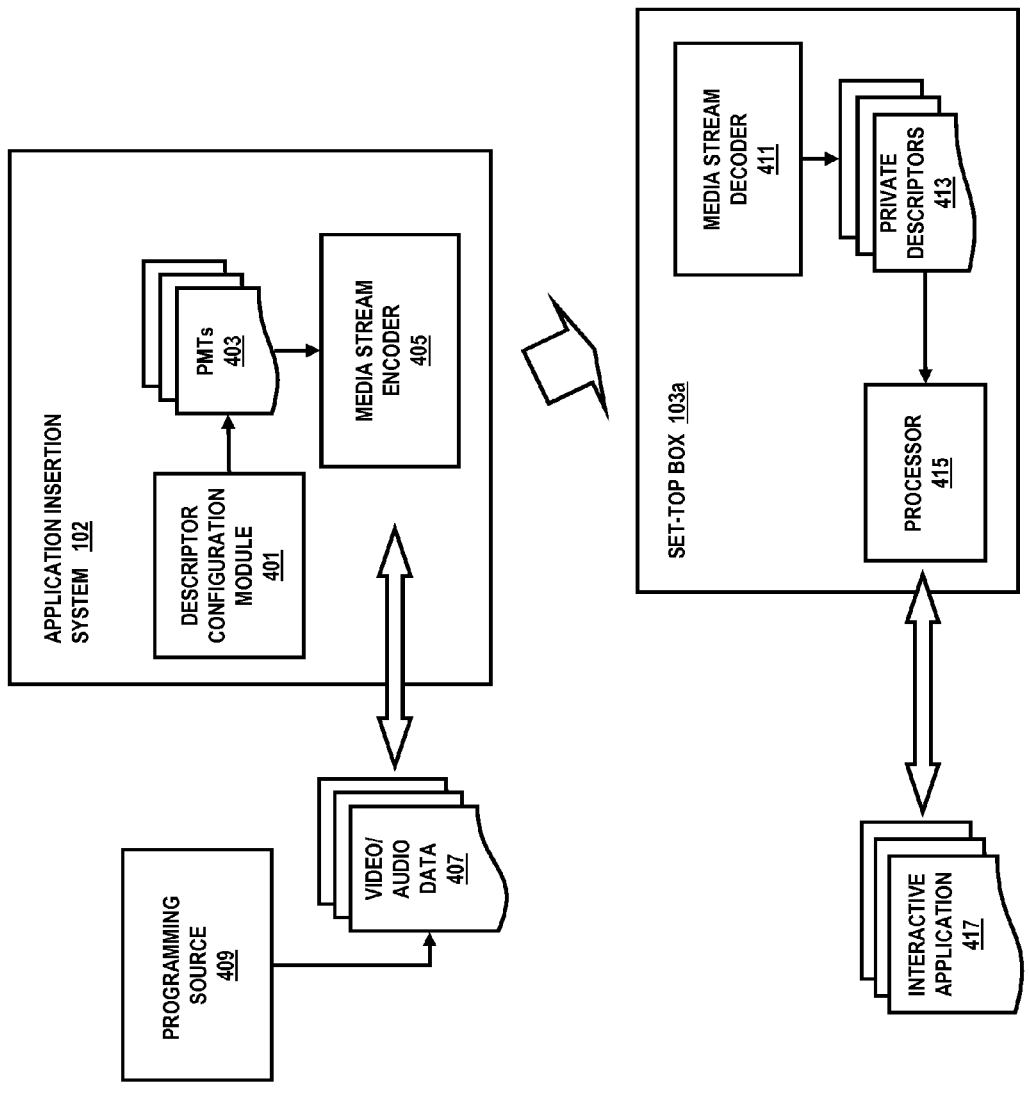
FIG. 4 is a diagram of an application insertion system, according to one embodiment.

FIG. 4 is a diagram of an application insertion system, according to one embodiment. For the purposes of explanation, application insertion system 102 is shown to include a descriptor configuration module 401 that sets the appropriate program parameters (e.g., private descriptors) within Program Map Tables (PMTs) of the corresponding video/audio data 407. These media data can originate from any of the content sources described with respect to system 100 of FIG. 1. The PMTs are included as part of the media streams encoded by media stream encoder 405. As noted, in certain embodiments, encoder 405 can employ an MPEG-2 scheme to generate the media stream for broadcast to one or more set-top boxes, such as set-top box 103a.

In this example, set-top box 103a, upon receiving the media stream, decodes, via media stream decoder 411, the media stream generated by application insertion system 102. As explained in FIG. 3, one or more private descriptors 413 can be extracted by processor 415. If the media stream is determined to be associated with an interactive application, processor 415 can retrieve the actual interactive application 417 from any number of sources (e.g., content provider systems 125).

STB 103a may comprise computing hardware (such as described with respect to FIGS. 8-10) and include additional components configured to provide services related to processing call event driven. In addition, STB 103a includes hardware and/or other components to support related functions and capabilities for viewing video content (e.g., remote control capabilities, conditional access functions, tuning functions, presentation functions, multiple network interfaces, audio/video signal ports, etc.). The functions and operations of STB 103a may be governed by processor 415 (or other controllers (not shown)) that interacts with each of the STB components to provide programming guide information and related content retrieved from an audio or video-sharing site, as well as from another STB device or component of system 100. In turn, the user may be afforded greater functionality utilizing a control device (e.g., remote control) to control the personalized programming guide service and related services.

STB 103a may be configured to communicate with a number of user devices, including: a PC 104, laptops, PDAs, cellular phones, mobile devices, handheld devices, as well as any other equivalent technology capable of capturing and storing media.

Figure 5B:
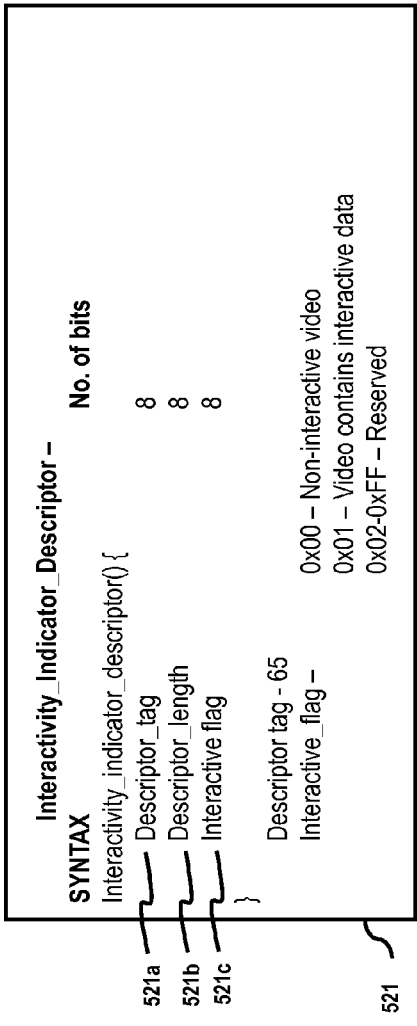
Figure 5C:
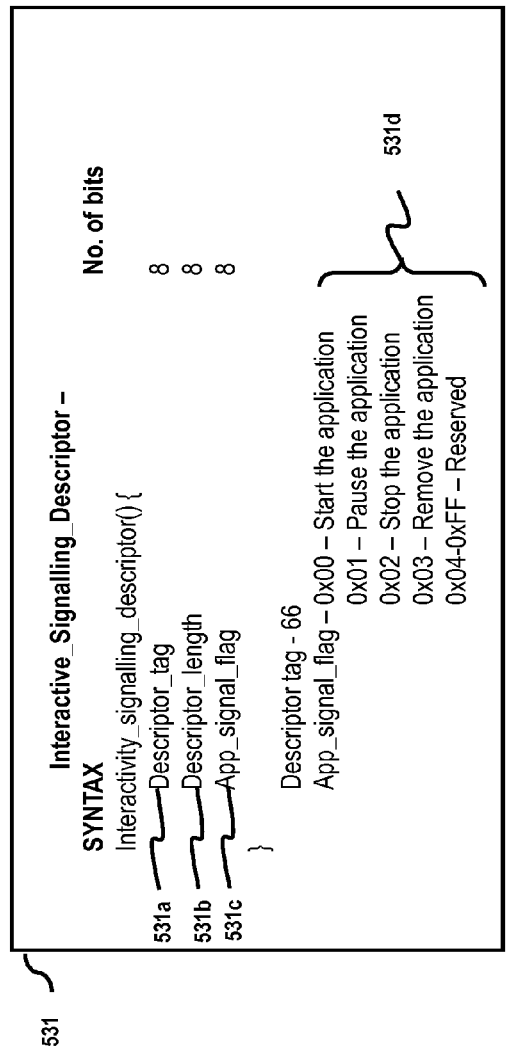

FIGS. 5A-5D are diagrams of private descriptors utilized to provide an interactive application within a media stream, according to various embodiments. For the purposes of illustration, a media stream 500 (as seen in FIG. 5A) includes a packet identifier (PID) field 501, other fields 503, and private descriptors section (or fields) 505. In one embodiment, the private descriptors section 505 includes one or more descriptors (shown as 1 to N). Each of the descriptors provides delimiters 507a, 509a and specifies a tag field 507b, 509b, a length field 507c, 509c, and a data field 507d, 509d. According to certain embodiments, FIGS. 5B and 5C show private descriptors that permit following functions/features (as explained with respect process 200 of FIG. 2): (1) whether the video stream is interactive—i.e., includes an interactive application; (2) playback control functions; and (3) broadcast data for the interactive application.

As shown in FIG. 5B, an interactivity indicator descriptor 521 defines a tag field 521a, a length field 521b, and an interactive flag field 521c; each of these fields 521a, 521b, 521c has 8 bits in length. The values of the interactive flag field 521c indicates whether the associated media stream is "non-interactive video" or "video contains interactive data." The values of such data can be further defined by a separate descriptor—that shown in FIG. 5D.

In one embodiment, an interactive signaling descriptor 531 (FIG. 5C) is defined. In addition to the descriptor tag field 531a and descriptor length field 531b, and an application signaling flag field 531c. Similar to the interactivity indicator descriptor 521, 8 bits can be assigned to each of these fields 531a-531c. The application signaling fields 531c can be defined according to playback control functions 531d: Start, Pause, Stop, or Remove the application. That is, once the application is executed with activation of the Start function, a user can control the application by temporarily halting the execution of the application with the Pause function, or simply terminating the application with the Stop function. Also, the user can have the application be removed from the STB 103a by invoking the Remove function.

Figure 5D:
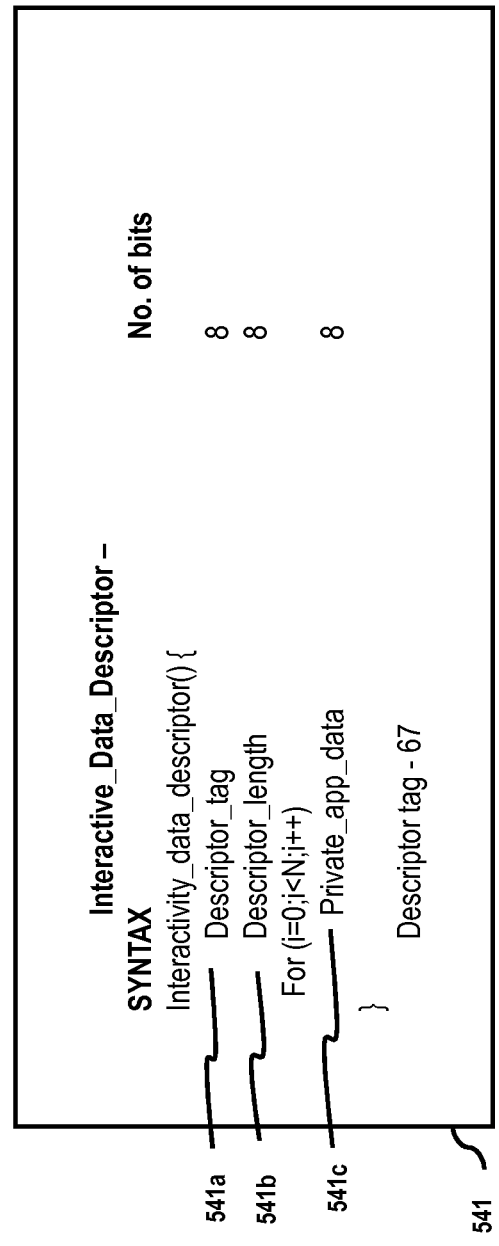

Regarding FIG. 5D, an interactive data descriptor 541 is utilized to designate or otherwise specify data to be broadcast. As with the other descriptors, the interactive data descriptor 541 provides 8 bits for tag field 541a and length field 541b. A private application data field 541c, which is also 8 bits, permits data to be specified by the user in conjunction with the interactive application, for example.

The above descriptors, in some embodiments, permit advertisers to employ a "pull" approach for advertisement information. The delivery of such advertisement information is further explained with respect to FIGS. 6 and 7.

Figure 6:
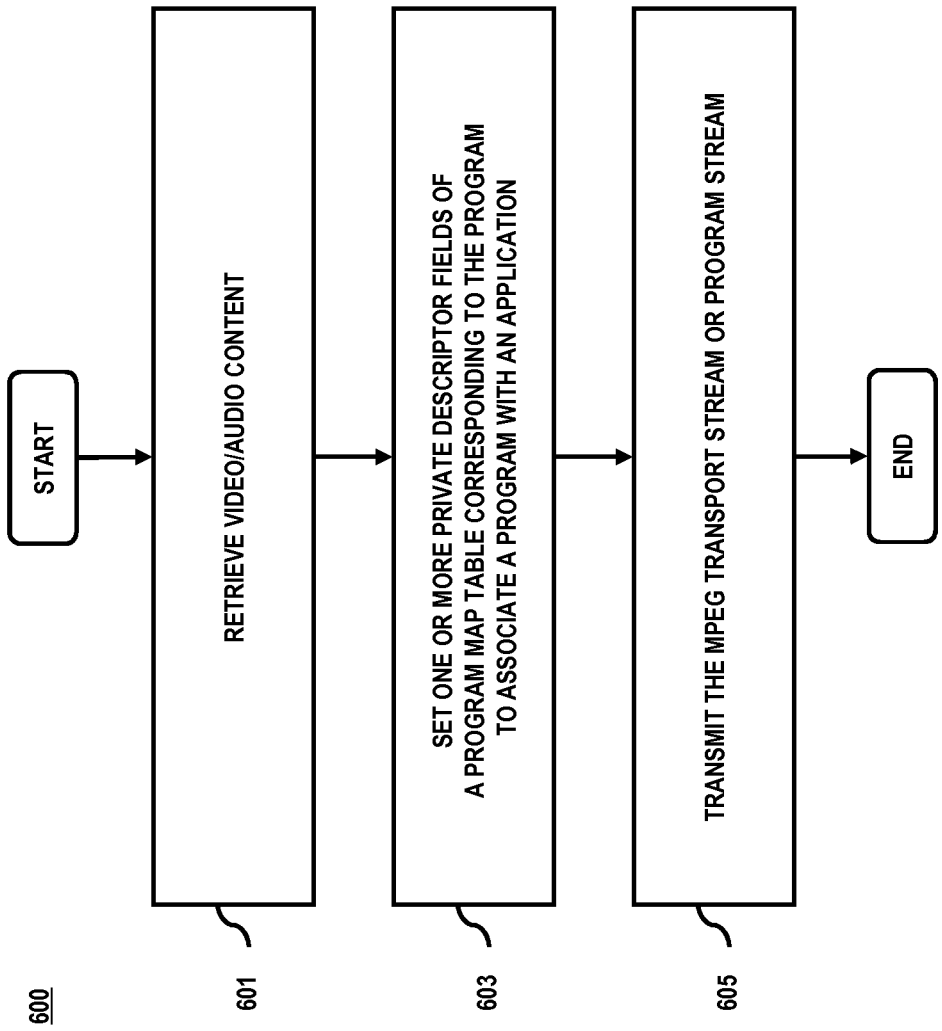
FIG. 6 is a flowchart of a process for modifying private descriptor fields within a transport stream or a program stream, according to one embodiment.

FIG. 6 is a flowchart of a process for modifying private descriptor fields within a transport stream or a program stream, according to one embodiment. Under this scenario, the descriptors of FIGS. 5B-5D are utilized. It is noted that the steps of process 600 may be performed in any suitable order, as well as combined or separated in any suitable manner. Also, process 300 may be implemented in, for instance, a chip set including a processor and a memory as shown in FIG. 10. For the purposes of explanation, process 600 is described with respect to the application insertion system 102 of FIG. 4.

In step 601, process 600 retrieves video/audio content 407 from a programming source 409. Descriptor configuration module 401 can then set the appropriate private descriptors of PMT 403. At this point, one or more private descriptors, e.g., interactivity indicator descriptor 521, interactive signaling descriptor 531, and interactive data descriptor 541, of the PMT can be configured (or set); this configuration can associate the program with an application (step 603). The application can be interactive and relate to or otherwise contain advertisement information. Module 401 operates in conjunction with media stream encoder 405 to output a transport stream (or program stream) with the altered PMT. Once the configuration of the descriptors are made, the stream (which may be a transport or a program stream) can be transmitted to the STB 103a, as in step 605.

Various use cases are now described relating to how process 600 can be implemented.

In one example, an automobile advertisement may be included, using process 600, in an MPEG stream during commercials in between a TV program. The automobile advertisement may be a general advertisement targeted to a national audience for a particular make and model of a vehicle, for instance. The private descriptors that correspond to the advertisement portion of the stream may be defined as explained above (FIGS. 5B-5D), and modified such that the interactivity indicator descriptor 521 is configured with an interactive flag value of 0x01 for the interactive flag field 521c; this flag value indicates that the video program has an interactive application. As such, another descriptor, interactive signaling descriptor 531, can be set so that the interactive application can be controlled. For example, the interactive application may be a promotional video of the vehicle of interest in which the video presents the terms of a special purchase or lease program in textual form. The user can pause the video to obtain the desired information. By contrast, traditional playback of advertisements (or commercials) do not permit any interactivity, and thus, vital information can be overlooked by the potential consumer.

The interactive data descriptor 541 can be configured with information in the private application data field 541c about local dealerships that are providing the special promotion on the purchase or lease. For example, the information in data field 541c may be include or refer to a source for retrieval of such information as contact information, dealership hours of operation, inventory information, pricing information, or a combination thereof. In one embodiment, a certain section of the automobile advertisement may display information that pertains to a dealership that is specific to the locality of the viewer such that the relevance of the advertisement to each individual viewer will be enhanced.

As another example, an advertisement for a nationwide pizza restaurant chain may be included in the MPEG stream. To incentivize consumers, the restaurant chain may launch a promotion involving redemption of coupons. However, because the restaurants may be part of a franchise in which not all restaurants are participating or may wish to participate with differing incentive amounts. Accordingly, various coupons with multiple levels of values are available for ordering a pizza; these values can vary by region, for instance. In this use case, interactive data descriptor 541 can be set to indicate an associated interactive application, which can provide the coupon information by region based on the configuration of the interactive data descriptor 541. Namely, the configuration of the data can be customized or tailored by accounting for the region in which the STB 103a is situated. In this manner, the coupons may be provided in the form of an interactive application such that users can obtain the coupons to order pizza, for example, directly from the interactive application.

In another example, an on-demand movie is delivered as MPEG streams. As part of the service provider's ability to support advertisements, the streaming of the movie may be interrupted to display an advertisement or an interactive application. Using the described private descriptors, the interactive application may be an interactive advertisement for a certain product and may require the user to wait at least a predetermined time interval (e.g. 30 seconds) before the MPEG stream resumes (during this period, the user may be provided with an opportunity to engage in a variety of content via the interactive application). For example, the user may be provided with simple interactive games. Another example of the interactive application is one that may provide the user with entertaining multimedia clips that incorporate the advertised product. By interacting with the application, the user is induced to increase his or her familiarity with the advertised product. After the 30 seconds have lapsed, the user may be provided with an option to quit the application and continue with the on-demand movie. If the user chooses to do so, the user may continue engaging the application as long as he or she wishes.

Figure 7:
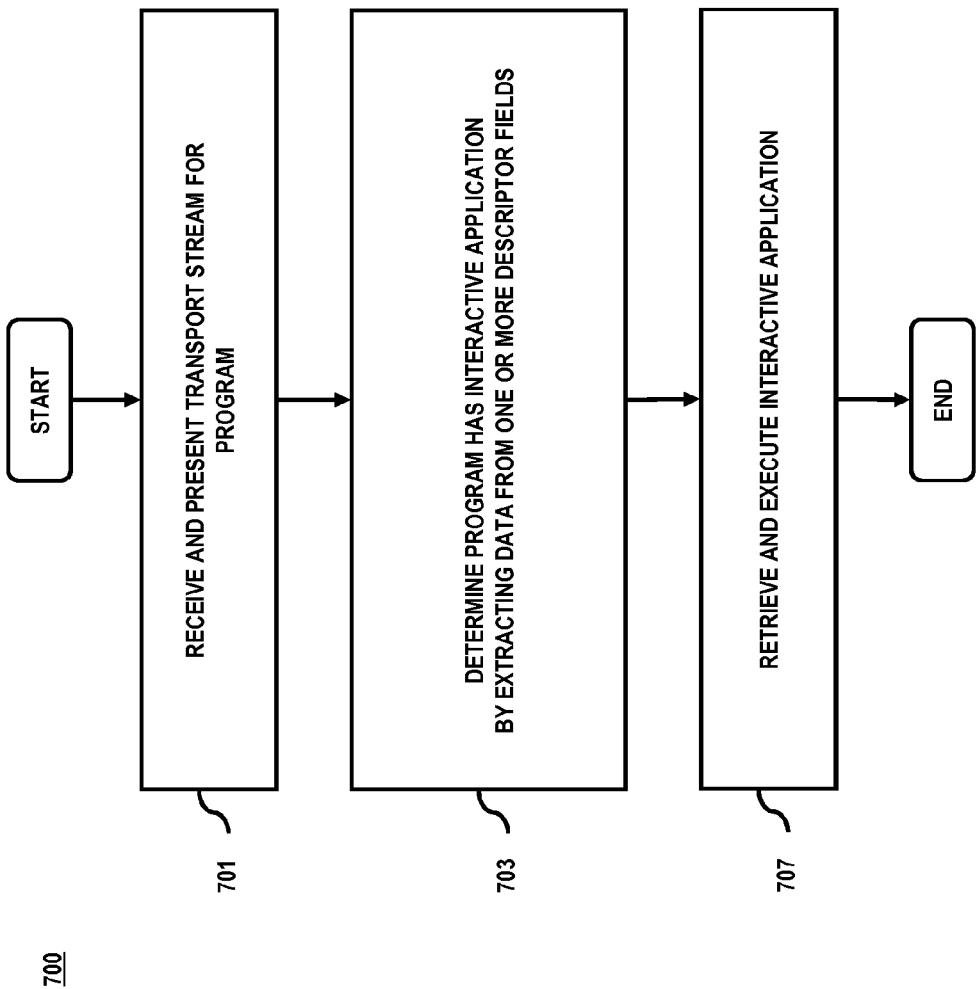
FIG. 7 is a flowchart of a process for executing an application associated with a media stream, according to one embodiment.

FIG. 7 is a flowchart of a process for executing an application associated with a media stream, according to one embodiment. For the purposes of explanation, process 700 is described with respect to the application insertion system 102 of FIG. 4. It is noted that the steps of process 700 may be performed in any suitable order, as well as combined or separated in any suitable manner. Also, process 700 may be implemented in, for instance, a chip set including a processor and a memory as shown in FIG. 10.

In step 701, a transport stream is received by STB 103a, which presents the video content of a program of interest. In step 703, STB 103a detects that the transport stream indicates existence of an interactive application for the program by extracting relevant data from the descriptor fields. Thereafter, process 700 retrieves the particular interactive application, and executes the program within STB 103a (step 707).

In one example, the application may be retrieved over packed-switched network 105 to service provider network 101 or a third party source (not shown). Also, the application may be transmitted in the MPEG stream and retrieved along with the MPEG stream. In a further example, the application may already be stored within the set-top box and loaded according to the instructions provided within the appropriate private descriptors.

It is contemplated that the application may be stored within STB 103a in advance of the receipt of the transport stream, according to certain embodiments. By way of example, the service provider may periodically pre-load the STBs 103a-103n with interactive applications so that upon receiving the corresponding media stream, the retrieval and execution of the particular application can be efficient—i.e., minimizes the delay based on the context of the applications (e.g., national, local, etc.).

Figure 8:
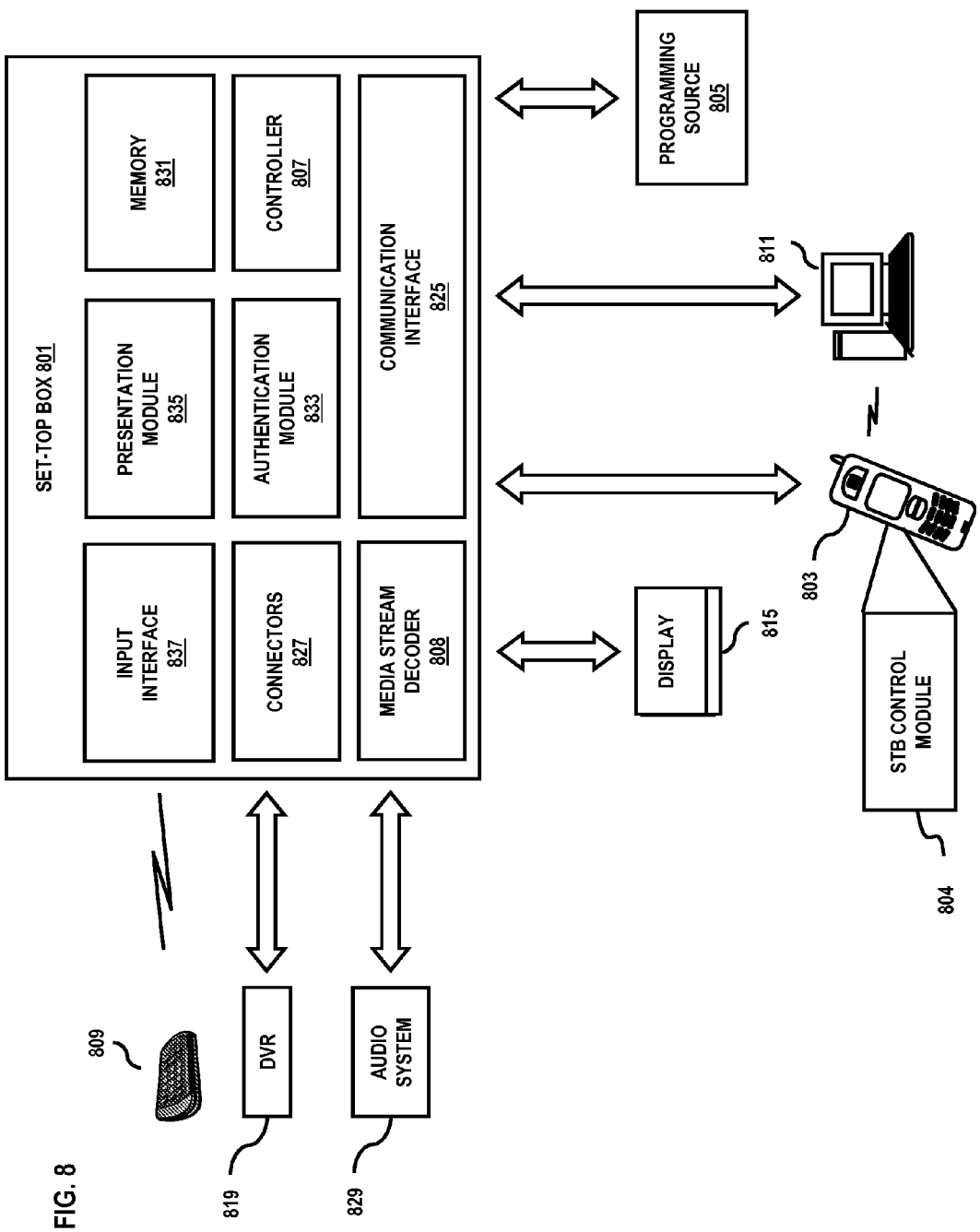
FIG. 8 is a diagram of a set-top box configured to be controlled based on sensor information from a user device, according to an exemplary embodiment.

FIG. 8 is a diagram of a set-top box configured to be controlled based on sensor information from a user device, according to an exemplary embodiment. STB 801 may utilize any suitable technology to receive media from user device 803 (e.g., mobile phone), as well as one or more media (or content) streams from a programming source 805, such as the IPTV system of FIG. 1. In this example, user device 803 includes an STB control module 804 to generate and forward sensor events to STB 801. STB control module 804 communicates with various sensors (e.g., a gyroscope, accelerometer, light sensor, proximity sensor, temperature sensor, pressure sensor, or magnetic sensor) of user device 803.

STB 801 may comprise computing hardware (such as described with respect to FIG. 9) and include additional components configured to provide services related to processing call event driven. In addition, STB 801 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 8, the functions and operations of STB 801 may be governed by a controller 807, which interacts with a media stream decoder 808. The decoder 808 can process media streams containing the descriptors of FIGS. 5A-5D. Additionally, controller 807 interacts with each of the STB components to provide programming guide information and related content retrieved from an audio or video-sharing site, as well as from another STB device or component of system 100. In turn, the user may be afforded greater functionality utilizing a control device 809 to control the personalized programming guide service and related services, as will be more fully described below.

STB 801 may be configured to communicate with a number of user devices, including: a PC 811, laptops, PDAs, cellular phones (e.g., device 803), mobile devices, handheld devices, as well as any other equivalent technology capable of capturing and storing media.

As such, STB 801 may be configured to provide an indicator that the STB 801 is being controlled by the mobile unit 803 on (or at) display 815. In one embodiment, presentation of the media (or content) may include: displaying, recording, playing, rewinding, forwarding, toggling, selecting, zooming, or any other processing technique that enables users to manipulate the media. For instance, STB 801 may provide one or more signals to the display 815 (e.g., television) so that the display 815 may present the media, as images, audio, video, or any combination thereof. A communication interface (not illustrated) of PC 811 may be configured to retrieve the programming and content information over the data network (e.g., packet-based network 105), wherein STB 801 may receive a programming content stream from PC 811 to present to the user via display 815.

STB 801 may also interact with a PVR, such as digital video recorder (DVR) 819, to store received content that can then be manipulated by a user at a later point in time. In various embodiments, DVR 819 may be network-based, e.g., included as a part of the service provider network 101, collocated at a subscriber site having connectivity to STB 801, and/or integrated into STB 801.

Furthermore, STB 801 may include a communication interface 825 configured to receive content streams from the programming service provider 111, PC 811, server (not shown), or other programming content source, such as media source 803. Communication interface 825 may optionally include single or multiple port interfaces. For example, STB 801 may establish a broadband connection to multiple sources transmitting content to STB 801 via a single port, whereas in alternative embodiments, multiple ports may be assigned to the one or more sources. In still other embodiments, communication interface 825 may be configured to permit users, via STB 801, to transmit data (including media content) to other users with STBs, a programming service provider 111, or other content source/sink.

According to various embodiments, STB 801 may also include inputs/outputs (e.g., connectors 827) to display 815 and DVR 819, as well as an audio system 829. In particular, audio system 829 may comprise a conventional audio-video receiver capable of monaural or stereo sound, as well as multichannel surround sound. Audio system 829 may include speakers, ear buds, headphones, or any other suitable component configured for personal or public dissemination. As such, STB 801, display 815, DVR 819, and audio system 829, for example, may support high resolution audio and/or video streams, such as high definition television (HDTV) or digital theater systems high definition (DTS-HD) audio. Thus, STB 801 may be configured to encapsulate data into a proper format with required credentials before transmitting onto one or more of the networks of FIG. 1 and de-encapsulate incoming traffic to dispatch data to display 815 and/or audio system 829.

In an exemplary embodiment, display 815 and/or audio system 829 may be configured with internet protocol (IP) capability (i.e., includes an IP stack, or is otherwise network addressable), such that the functions of STB 801 may be assumed by display 815 and/or audio system 829. In this manner, an IP ready, HDTV display or DTS-HD audio system may be directly connected to one or more service provider networks 101, packet-based networks 105, and/or telephony networks 107. Although STB 801, display 815, DVR 819, and audio system 829 are shown separately, it is contemplated that these components may be integrated into a single component, or other combination of components.

Authentication module 833 with STB 801 may also be responsible for detecting and authenticating one or more user devices 803. Additionally, authentication module 833 may be provided to initiate or respond to authentication schemes of, for instance, service provider network 101 or various other content providers, e.g., broadcast television systems 123, third-party content provider systems 125, or servers 119. Authentication module 833 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 801 may identify and authenticate a second device (e.g., PC 811) communicatively coupled to, or associated with, STB 801, or vice versa. Further, authentication information may be stored locally at memory 831, in a repository (not shown) connected to STB 801, or at a remote repository, e.g., user profile repository 121.

Authentication module 833 may also facilitate the reception of data from single or disparate sources. For instance, STB 801 may receive broadcast video from a first source (e.g., IPTV system 111), signals from a second source (e.g., server 119), and a programming content stream from a third source accessible over a data network (e.g., content repository 109). As such, display 815 may present the broadcast video and programming content stream to the user. This presentation may be experienced separately, concurrently, in a toggled fashion, or with zooming, maximizing, minimizing, or trick capabilities, or equivalent mode.

Connector(s) 827 may provide various physical interfaces to display 815, audio system 829, as well as other peripherals; the physical interfaces may include, for example, RJ45, RJ11, high definition multimedia interface (HDMI), optical, coax, FireWire, wireless, and universal serial bus (USB), or any other suitable connector. The presentation module 835 may also interact with a control device 809 for determining particular media content that a user desires to experience. In an exemplary embodiment, the control device 809 may comprise a remote control (or other access device having control capability, such as a PC 811, wireless device, mobile phone, etc.) that provides a user with the ability to readily manipulate and dynamically change parameters affecting the device event-based STB control service. In other examples, STB 801 may be configured for voice recognition such that STB 801 may be controlled with spoken utterances.

In addition to the user device 803 being configured to control the manner in which STB 801 behaves in response to device events, STB 801 may also permit control device 809 to activate and deactivate the device event-based STB control service. In this manner, control device 809 may include (not shown) a cursor controller, trackball, touch screen, touch pad, keyboard, and/or a key pad for activating a slideshow application, selecting programming content, as well as performing other control functions. Control device 809 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 809 may comprise a memory (not illustrated) for storing preferences relating the device event-based STB control service; such preferences can be conveyed to STB 801 through an input interface 837. The input interface 837 may support any type of wired and/or wireless link, e.g., infrared, radio frequency (RF), BLUETOOTH™, and the like. Thus, control device 809 may store user preferences with respect to the parameters associated with the device event-based STB control service. Alternatively, user preferences may be tracked, recorded, or stored in STB 801 or in a network user profile repository 121. The preferences may be automatically retrieved and activated by a user at any time. It is noted that the control device 809 may be separate from STB 801 or may be integrated within STB 801 (in which case certain input interface hardware and/or software may not be necessary).

The described processes and arrangement, in some embodiments, advantageously enable an efficient and flexible approach to introducing interactive applications and/or advertisement information within a media stream without requiring hardware upgrade or replacement.

The processes described herein for interactive application and advertisement within media streams may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
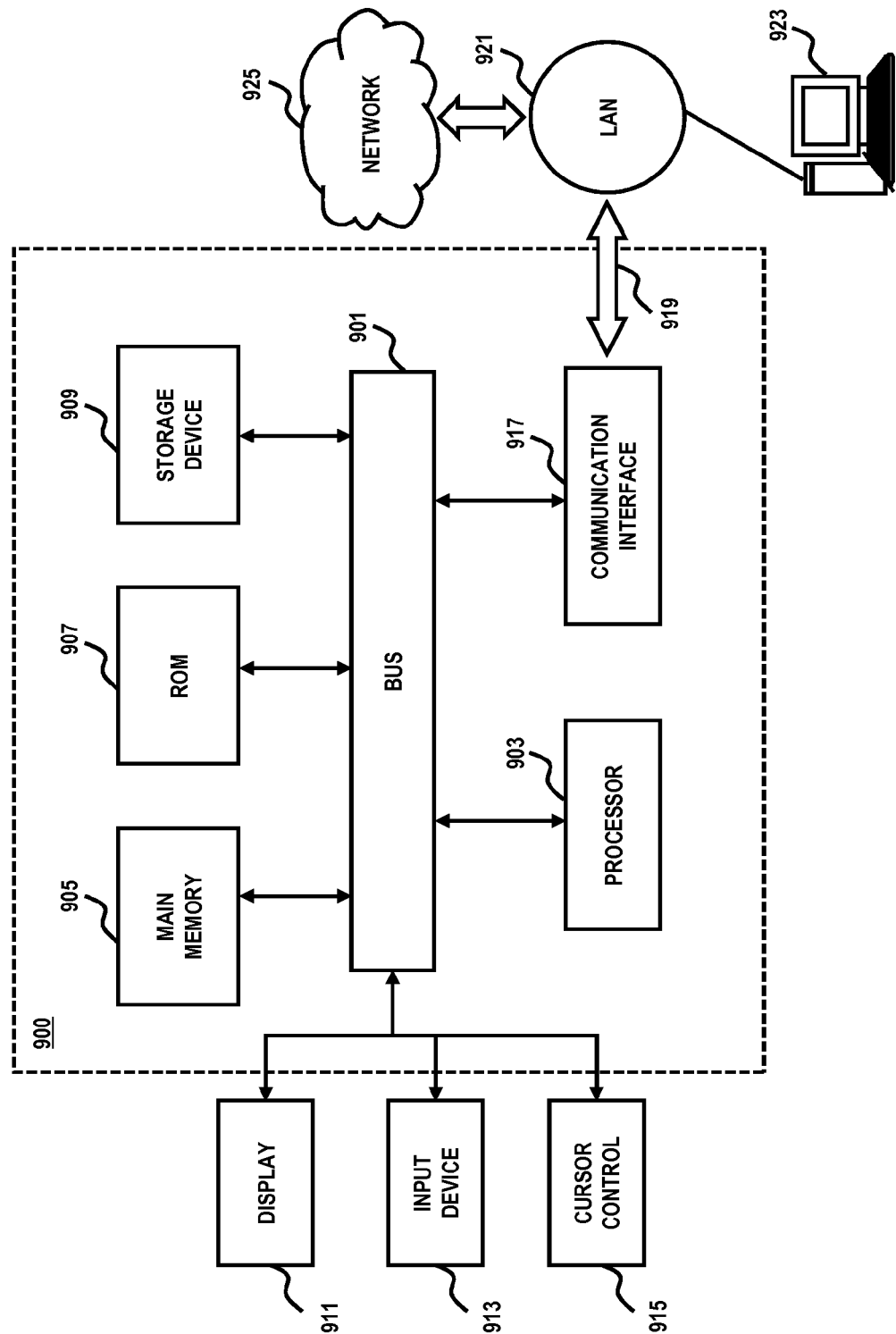
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to certain embodiments, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 2, 3 6, and, 7.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    retrieving a program map table of a media stream, wherein the program map table includes a plurality of private descriptor fields that permit user specified tag values configuring one of the descriptor fields to have a bit value indicating that the media stream is associated with an interactive application;

configuring another one of the descriptor fields to indicate a command for controlling the interactive application; and initiating delivery of the media stream to a set-top box, wherein the interactive application is stored separate from the media stream and is retrieved for execution within the set-top box when launched for execution, wherein the interactive application interrupts playing of the media stream and requires a viewer of the media stream to wait a predetermined time interval before the viewer is provided an option to quit the interactive application and resume the media stream, wherein the media stream includes a Motion Pictures Expert Group (MPEG) transport stream, and the program map table provides mapping between a plurality of program numbers and a plurality of program elements, and wherein the set-top box is configured to instantiate the interactive application and to execute the instantiated interactive application.

2. A method according to claim 1, wherein the command specifies either a start function, an end function, a pause function, or a remove application function.

3. A method according to claim 1, further comprising: configuring another one of the descriptor fields to broadcast data for launching the interactive application.

4. A method according to claim 1, wherein the set-top box is configured to download the interactive application from storage within the set-top box.

5. An apparatus comprising:

at least one processor; and at least one memory including computer program code, the at least one memory and the computer program code configured to, with the at least one processor, cause the apparatus to perform at least the following, retrieving a program map table of a media stream, wherein the program map table includes a plurality of private descriptor fields that permit user specified tag values, configuring one of the descriptor fields to have a bit value indicating that the media stream is associated with an interactive application, and initiating delivery of the media stream to a set-top box, wherein the interactive application is stored separate from the media stream and is retrieved for execution within the set-top box when launched for execution, wherein the interactive application interrupts playing of the media stream and requires a viewer of the media stream to wait a predetermined time interval before the viewer is provided an option to quit the interactive application and resume the media stream, wherein the apparatus is further caused, at least in part, to: configuring another one of the descriptor fields to indicate a command for controlling the interactive application, wherein the media stream includes a Motion Pictures Expert Group (MPEG) transport stream, and the program map table provides mapping between a plurality of program numbers and a plurality of program elements, and wherein the set-top box is configured to instantiate the interactive application and to execute the instantiated interactive application.

6. An apparatus according to claim 5, wherein the command specifies either a start function, an end function, a pause function, or a remove application function.

7. An apparatus according to claim 5, wherein the apparatus is further caused, at least in part, to: configuring another one of the descriptor fields to broadcast data for launching the interactive application.

8. An apparatus according to claim 5, wherein the set-top box is configured to download the interactive application from storage within the set-top box.

9. A method comprising:

receiving, at a set-top box, a media stream specifying a program map table that includes a plurality of private descriptor fields that permit user specified tag values; and determining, at the set-top box, that the media stream is associated with an interactive application by examining one or more of the private descriptor fields, wherein the one or more of the private description fields has a bit value indicating that the media stream is associated with the interactive application, wherein the interactive application is stored separate from the media stream and is retrieved for execution within the set-top box when launched for execution, wherein the interactive application interrupts playing of the media stream and requires a viewer of the media stream to wait a predetermined time interval before the viewer is provided an option to quit the interactive application and resume the media stream, wherein another one of the descriptor fields indicates a command for controlling the interactive application, wherein the media stream includes a Motion Pictures Expert Group (MPEG) transport stream, and the program map table provides mapping between a plurality of program numbers and a plurality of program elements, and wherein the set-top box is configured to instantiate the interactive application and to execute the instantiated interactive application.

10. A method according to claim 9, wherein the command specifies either a start function, an end function, a pause function, or a remove application function.

11. A method according to claim 10, wherein another one of the descriptor fields specifies broadcast data for launching the interactive application, and wherein the set-top box is configured to download the interactive application from storage within the set-top box.

12. A set-top box device comprising:

a processor configured to receive a media stream specifying a program map table that includes a plurality of private descriptor fields that permit user specified tag values; and a memory configured to store the media stream, wherein the processor is further configured to determine that the media stream is associated with an interactive application by examining one or more of the private descriptor fields, wherein the one or more of the private description fields has bit a value indicating that the media stream is associated with the interactive application or advertisement information, wherein the interactive application is stored separate from the media stream and is retrieved for execution within the set-top box when launched for execution, and wherein the interactive application interrupts playing of the media stream and requires a viewer of the media stream to wait a predetermined time interval before the viewer is provided an option to quit the interactive application and resume the media stream, wherein another one of the descriptor fields indicates a command for controlling the interactive application, wherein the media stream includes a Motion Pictures Expert Group (MPEG) transport stream, and the program map table provides mapping between a plurality of program numbers and a plurality of program elements, and wherein the set-top box is configured to instantiate the interactive application and to execute the instantiated interactive application.

13. A set-top box device according to claim 12, wherein the command specifies either a start function, an end function, a pause function, or a remove application function.

14. A set-top box device according to claim 13, wherein another one of the descriptor fields specifies broadcast data for launching the interactive application, and wherein the set-top box is configured to download the interactive application from storage within the set-top box.

* * * * *